US010620035B2

(12) United States Patent
Finnance et al.

(10) Patent No.: US 10,620,035 B2
(45) Date of Patent: Apr. 14, 2020

(54) WEIGHING DEVICE FOR COMESTIBLE PROCESSORS

(71) Applicant: Capbran Holdings, LLC, Los Angeles, CA (US)

(72) Inventors: Robert Finnance, Los Angeles, CA (US); Lenny Sands, Los Angeles, CA (US)

(73) Assignee: Capbran Holdings, LLC, Los Angeles, CA (US)

(*) Notice: Subject to any disclaimer, the term of this patent is extended or adjusted under 35 U.S.C. 154(b) by 113 days.

(21) Appl. No.: 15/698,530

(22) Filed: Sep. 7, 2017

(65) Prior Publication Data

US 2018/0073915 A1 Mar. 15, 2018

Related U.S. Application Data

(60) Provisional application No. 62/385,703, filed on Sep. 9, 2016, provisional application No. 62/468,575, filed on Mar. 8, 2017.

(51) Int. Cl.
| | |
|---|---|
| *G01G 19/52* | (2006.01) |
| *G01G 19/30* | (2006.01) |
| *A47J 43/046* | (2006.01) |
| *A47J 43/07* | (2006.01) |
| *G01G 19/56* | (2006.01) |
| *A47J 36/32* | (2006.01) |
| *G01G 23/37* | (2006.01) |

(52) U.S. Cl.
CPC ............ *G01G 19/52* (2013.01); *A47J 36/321* (2018.08); *A47J 43/046* (2013.01); *A47J 43/0716* (2013.01); *G01G 19/30* (2013.01); *G01G 19/56* (2013.01); *A47J 36/32* (2013.01); *G01G 23/3735* (2013.01)

(58) Field of Classification Search
CPC ........ G01G 19/30; G01G 19/52; G01G 19/56; G01G 23/3735; A47J 43/046; A47J 43/0716; A47J 36/32
See application file for complete search history.

(56) References Cited

U.S. PATENT DOCUMENTS

| | | | |
|---|---|---|---|
| 8,829,365 B1* | 9/2014 | Wallace ................ | G06F 13/382 177/25.13 |
| 9,981,790 B1* | 5/2018 | Ost ...................... | B65D 51/245 |
| 2010/0089152 A1* | 4/2010 | Kolada .................. | G01F 19/00 73/426 |
| 2013/0200064 A1* | 8/2013 | Alexander ......... | A47G 19/2288 219/441 |
| 2013/0220708 A1* | 8/2013 | Kim ..................... | G01G 19/025 177/3 |
| 2015/0107910 A1* | 4/2015 | Villard ............... | G01G 19/4146 177/25.12 |
| 2015/0201884 A1* | 7/2015 | Ashokan .............. | A61B 5/4872 702/19 |
| 2016/0256003 A1* | 9/2016 | Altenritter ........... | A47J 43/046 |
| 2016/0327427 A1* | 11/2016 | Briones .................... | A61J 7/02 |
| 2017/0245679 A1* | 8/2017 | Watts ..................... | A47J 36/24 |

* cited by examiner

*Primary Examiner* — Randy W Gibson
(74) *Attorney, Agent, or Firm* — Trojan Law Offices

(57) ABSTRACT

A system for weighing ingredients of food and drink for a recipe application, which comprises a weighing device for use with blenders and food processors that can wirelessly communicate weight measurements and other data to the recipe application on a mobile device or computer. The weighing device can be removably attached to or integrated with the blender or food processor.

16 Claims, 12 Drawing Sheets

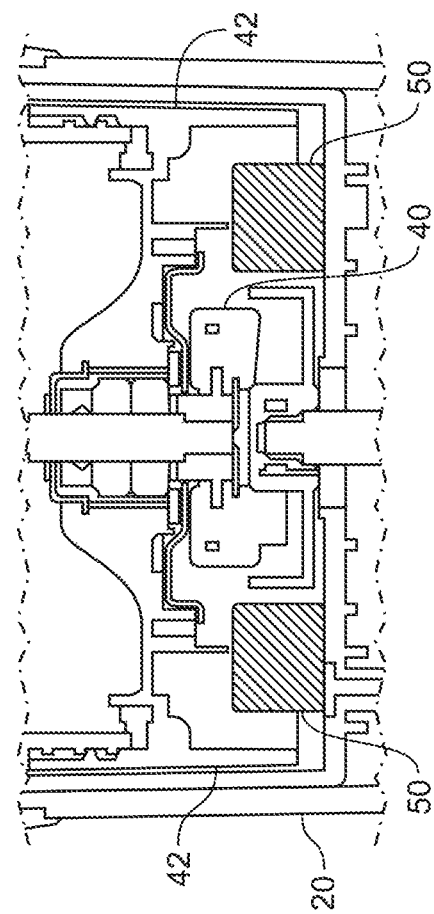
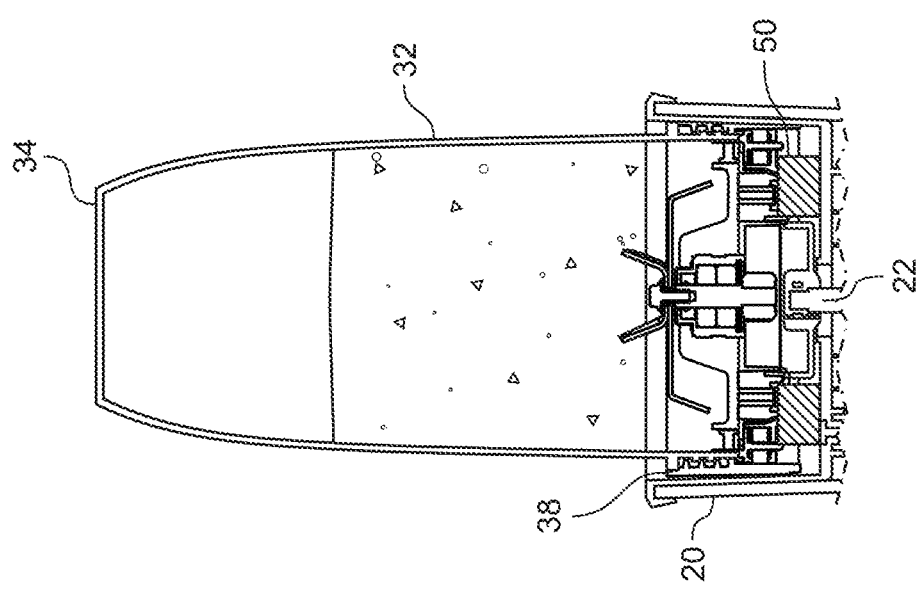
Fig. 6a
Fig. 6b

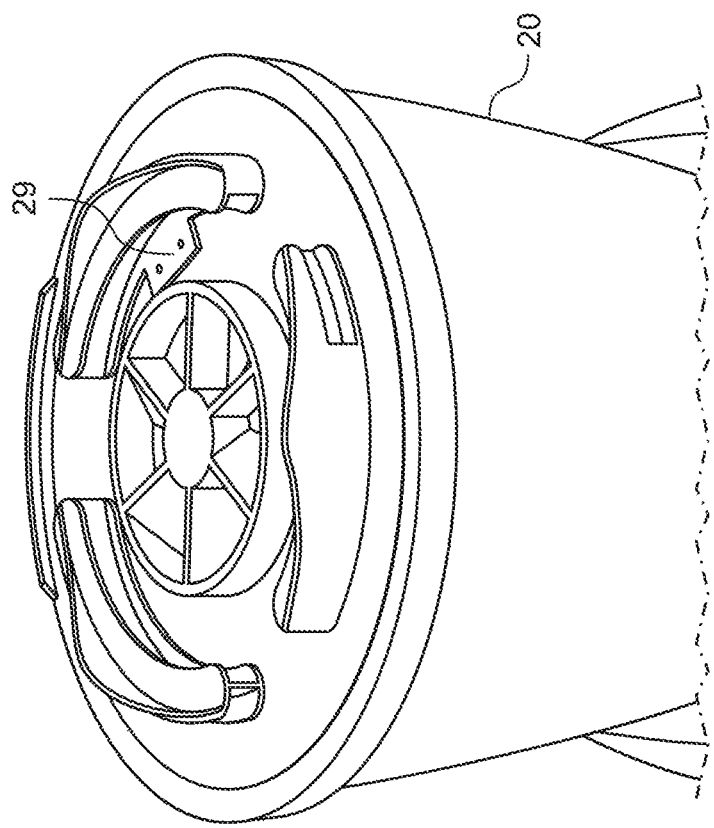
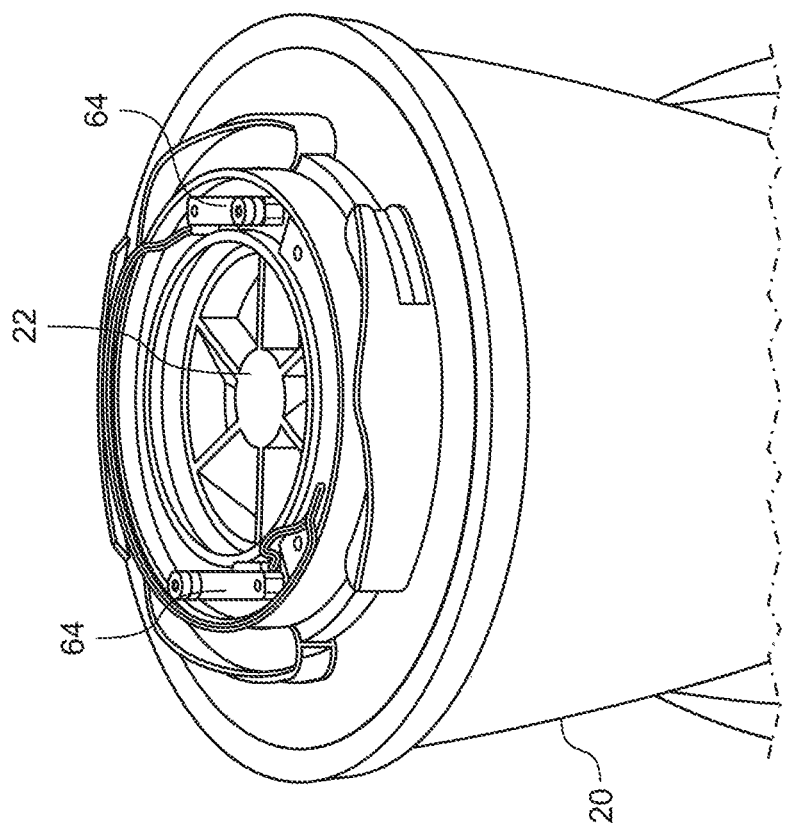

WEIGHING DEVICE FOR COMESTIBLE PROCESSORS

CROSS-REFERENCE TO RELATED APPLICATIONS

This patent claims the benefit of U.S. Provisional Application No. 62/385,703 filed on Sep. 9, 2016, and U.S. Provisional Application No. 62/468,575, filed on Mar. 8, 2017, which applications are incorporated herein by reference in their entirety for all purposes.

TECHNICAL FIELD

The present invention relates to a system for weighing foods and liquids in blenders or food processors, and more particularly, to an integrated and removable weighing device for measuring the weight of ingredients for a blender, or other mixing device, such as a food processor, which can communicate with a software application on a mobile device or computer.

BACKGROUND

Blenders and food processors are household appliances commonly used to blend, mix, chop, and otherwise process drinks and/or foods. A conventional blender typically has a container with an opening for receiving the liquid or food to be processed. The container has a blade assembly with blades for processing the content in the container. To operate the blender, the container is mounted on a base having a motor that is configured to drive an impeller. The container is mounted on the base by coupling the blade assembly to the impeller. When the motor is activated, it drives the impeller so as to turn the blades to process the content in the container. Typically, the blender can be operated according to various functions selected by the user.

A critical aspect of preparing food or drink is to correctly process the content according to a prescribed recipe. In following a recipe, however, a problem that commonly occurs is the inaccurate or erroneous weighing of ingredients. The problem is often exacerbated when it is necessary to adjust the ratio of the ingredients in a recipe. For example, it is often necessary to scale up or scale down the proportions of ingredients or adjust the proportions if a mistake is made in adding too much of a certain ingredient. Accordingly, there is a need for a system to facilitate the accurate measurement of ingredients for processing in blenders or food processors.

Further, it is common nowadays to use mobile devices, such as smartphones or tablets, to pull a recipe from the Internet. There are often various iterations of a particular recipe based on feedback from different users. Accordingly, there is a need for a system to facilitate the accurate measurement of ingredients for executing a recipe that can interactive with mobile devices.

SUMMARY OF THE INVENTION

The present invention is a system for processing comestible content, where comestible content includes both solid and liquid substances. The system comprises a processing device (such as a blender or food processor), a weighing device (such as an electronic scale), and a mobile device (such as a smartphone or tablet), or a laptop or other computing device.

The processing device is generally comprised of a motor base and a container assembly. The base has a motor for driving an impeller (also referred to as motor drive coupling). The container assembly is generally comprised of a container body and a blade assembly. The container body has an open end for receiving the comestible content to be processed. The blade assembly is comprised of a blade mechanism (for blending, mixing, chopping, or otherwise processing the comestible content) and a blade holder. The blade assembly can be integrally affixed or removably affixed to the container body. The processing device is operated by mounting the container assembly on the base by coupling the blade assembly with the impeller and turning on the motor.

One embodiment of the weighing device is an electronic scale having load cells and associated electronics, including a means for wireless communication with a mobile device. The weighing device is adapted to fit on the base and under the container assembly for weighing the comestible content in the container assembly. The weighing device is also removable such that it can be used as a portable scale to weigh the comestible content when the container assembly is not mounted on the base. Alternatively, the weighing device can also be integrated in the base.

For the weighing device to fit between the base and the container assembly without interfering with the coupling between the impeller and the blade assembly, the weighing device is preferably donut-shaped so that the blade assembly can couple with the impeller through the hollow space at the center of the weighing device. The weighing device can be powered by an internal battery or plugged into an external power source, such as the base or a separate charging station.

The weighing device can wirelessly communicate with the mobile device so as to communicate information relating to the weighing of the comestible content to the mobile device. In this way, the user can adjust the weight of the comestible content based on feedback from the mobile device.

BRIEF DESCRIPTION OF THE DRAWINGS

FIG. 6(a) is a partial cross-sectional view of an embodiment of the invention with the container assembly engaged with the base.

FIG. 6(b) is a partial cross-sectional view of an embodiment of the invention with the container assembly engaged with the base.

FIG. 9(a) is a perspective view of load cells inside a weighing device according to an embodiment of the invention.

FIG. 9(b) is a perspective view of a base having plug receptors for load cells to be plugged into the base according to an embodiment of the invention.

DETAILED DESCRIPTION OF THE INVENTION

In an embodiment of the present invention, an electronic weighing device is configured to enable blenders or food processors to work with recipe applications on mobile devices, tablets, laptops or computers to prepare drinks or foods according to a recipe. The weighing device is configured to weigh the ingredients that are to be processed according to the recipe and transmit the weight information to a mobile device. For example, the weighing device enables a user to follow and complete a drink recipe using a mobile phone application by providing the application with real-time weight information about the ingredients being used in the recipe. Further, the weighing device is capable of attaching to existing blending devices or new blending devices specially designed to accommodate it. The weighing device can also be integrated into the blending devices.

Figure 1:
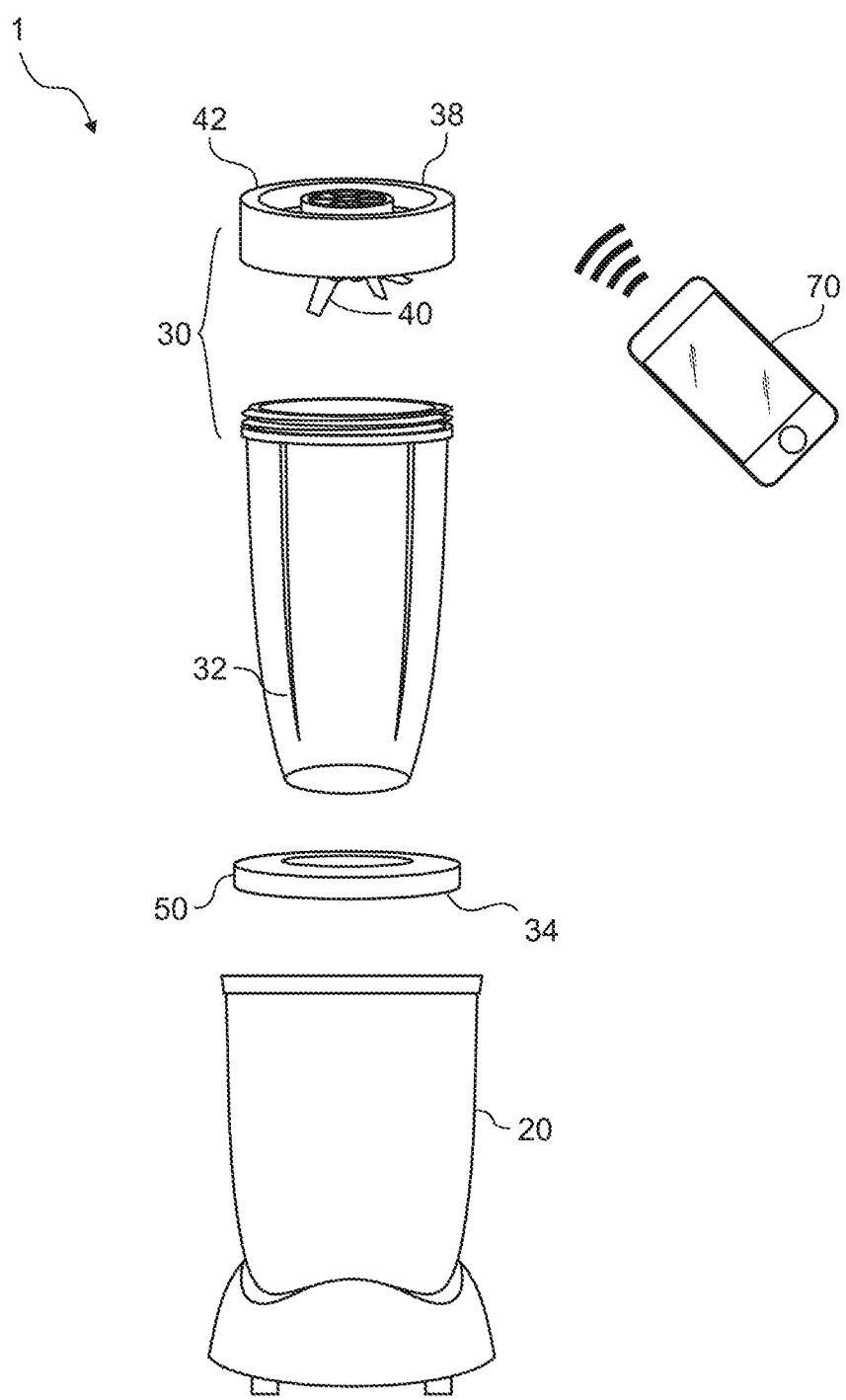
FIG. 1 is an exploded view of a system according to an embodiment of the present invention.
Figure 2:
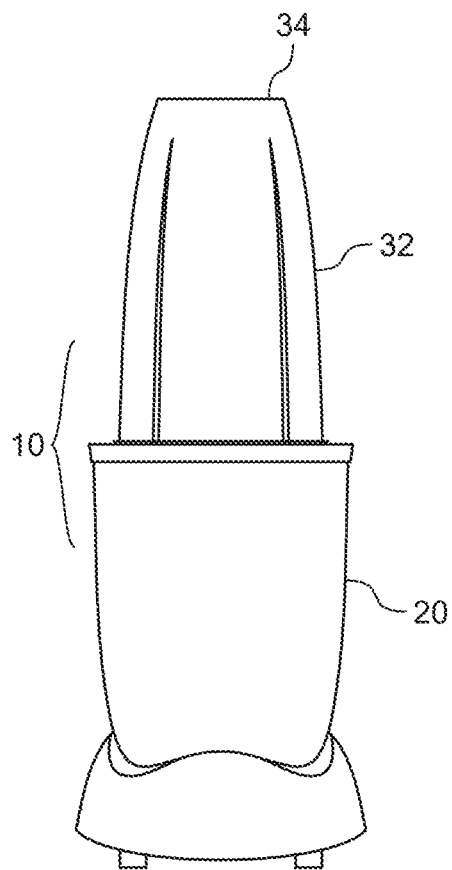
FIG. 2 is a side view of a comestible processing device according to an embodiment of the invention.
Figure 3:
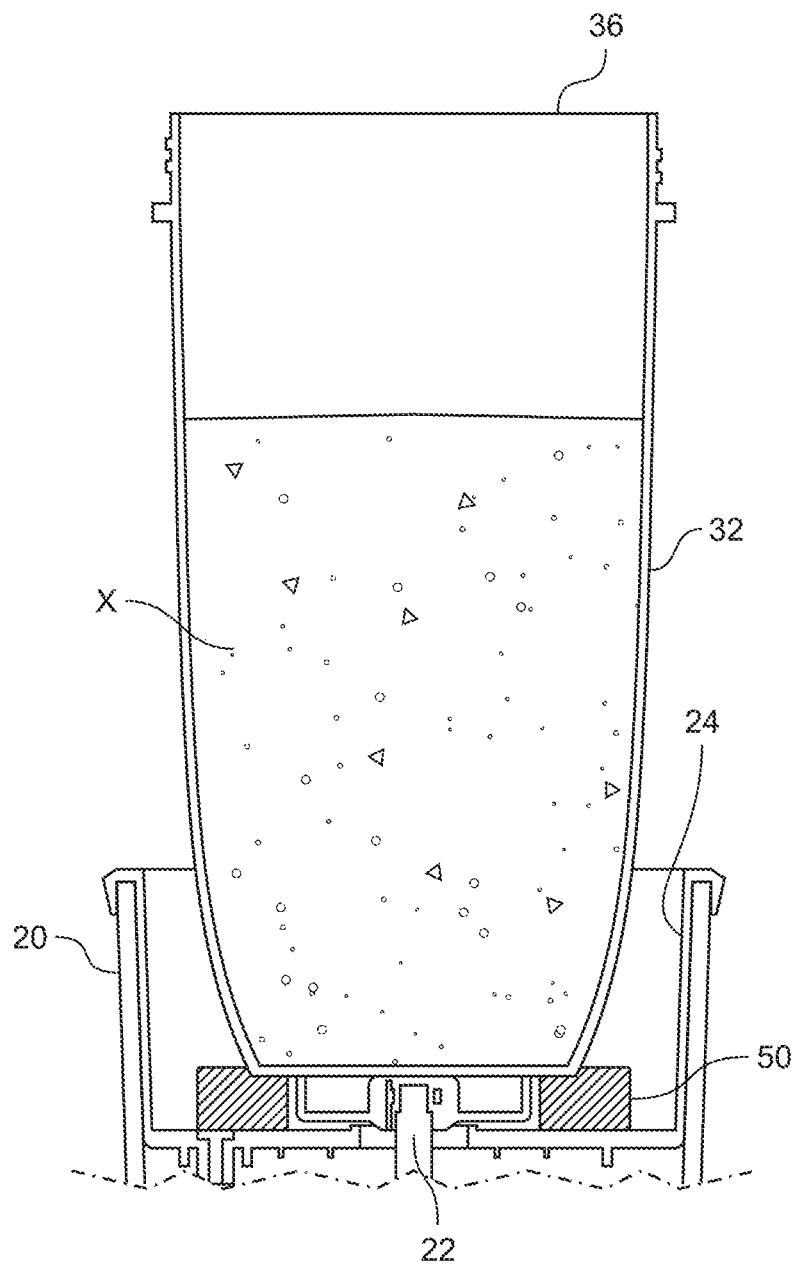
FIG. 3 is a cross-sectional view of an embodiment of the invention.

Referring generally to FIGS. 1-3, a system (1) for processing comestible content X according to an embodiment of the present invention is comprised of a comestible processing device (10), a weighing device (50), and a mobile device (70).

Figure 7A:
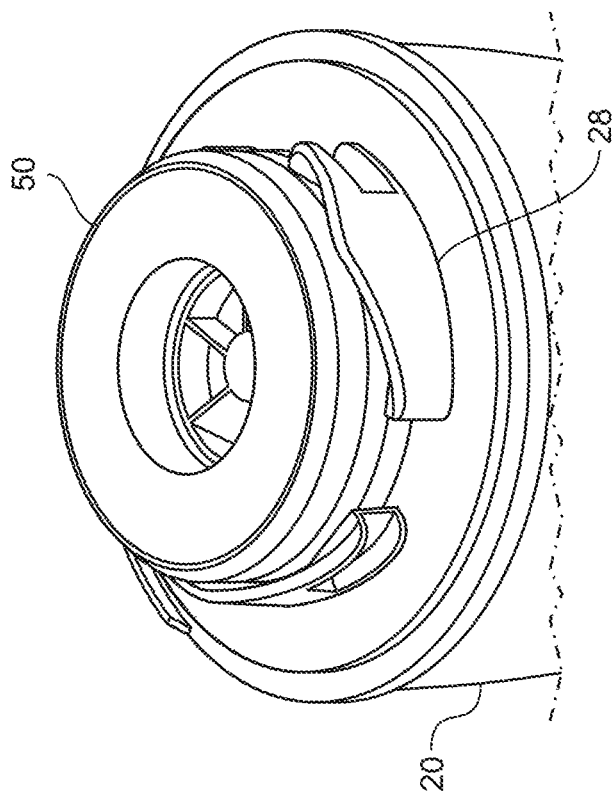
FIG. 7(a) is a perspective view of an embodiment of the invention.

The comestible processing device (10) is comprised of base (20) and a container assembly (30). The base (20) has a motor (not shown) for driving an impeller (22) shown in FIG. 3. The base (20) can have a recessed well (24) as shown in FIG. 3, or ramps (28) as shown in FIG. 7(a), for retaining the container assembly (30). The container assembly (30) is comprised of a container body (32) and a blade assembly (38). In the embodiment shown in FIG. 3, the container body (32) has a closed end (34) and an open end (36) for receiving comestible content X to be processed. The blade assembly (38) has a blade mechanism (40) attached to a blade holder (42). In some conventional blenders, the blade assembly is integrally affixed to the container body. The blade assembly (38) can be removably affixed to the open end (36) of the container body (32) as indicated in FIG. 1 and shown in FIG. 6(a). When the blade assembly (38) is securely affixed to the container body (32), the container assembly (30) can be flipped to mount the container assembly (32) onto the base (20) by coupling the blade assembly (38) with the impeller (22) as shown in FIGS. 6(a) and 6(b).

Figure 4B:
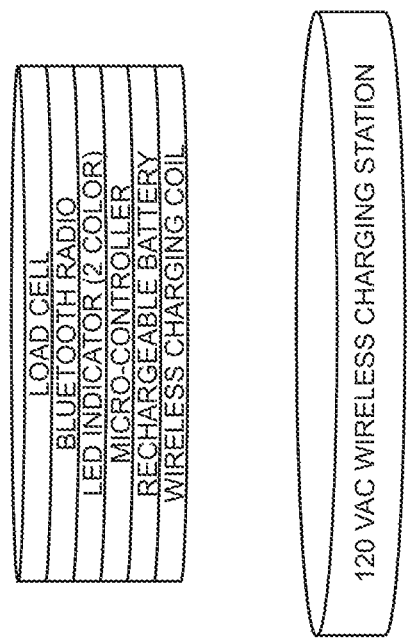
FIG. 4(b) is a schematic of the components of a weighing device according to an embodiment of the invention.
Figure 4A:
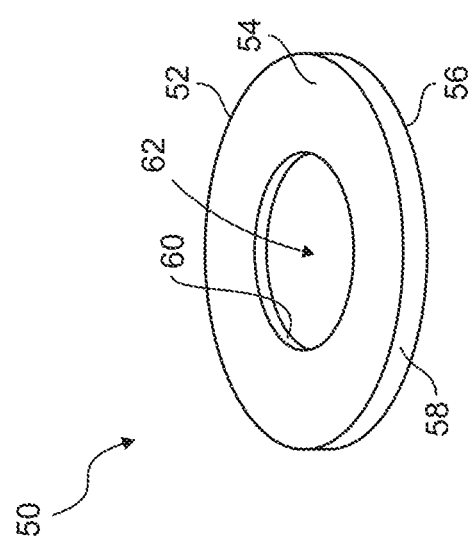
FIG. 4(a) is a perspective view of a weighing device according to an embodiment of the invention.

In a preferred embodiment of the invention as shown in FIG. 4(a), the weighing device (50) is annular, having a donut-shape casing (52) with a top surface (54), a bottom surface (56), an outer circumferential surface (58), and an inner circumferential surface (60) defining a hole (62). The weighing device (50) includes one or more load cells, PCB, Bluetooth radio, LED indicator, charging coil and rechargeable battery as indicated in FIG. 4(b). The internal components of the weighing device (5) are hermetically sealed in casing (52) so that the weighing device (50) can be washed without damaging the internal components. The weighing device (50) can also be charged on a separate charging station or through a connection with the base.

Figure 5:
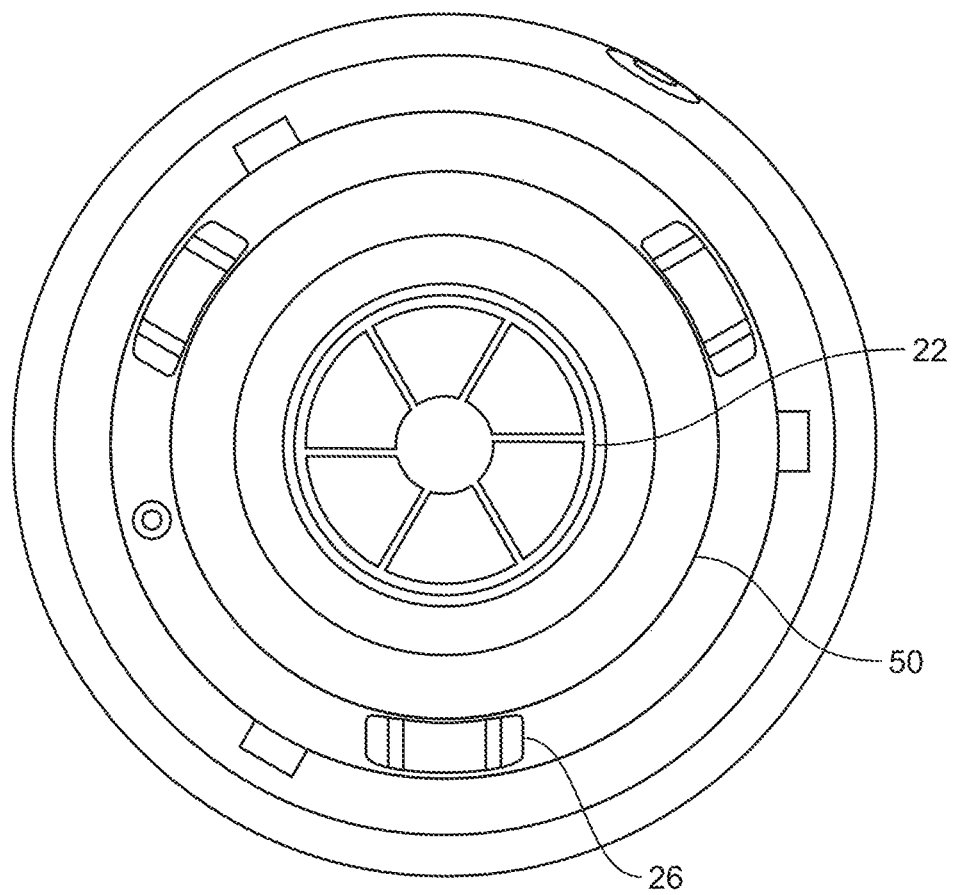
FIG. 5 is a top view of a weighing device on a base according to an embodiment of the invention.

Referring again to the embodiment shown in FIG. 3, the weighing device (50) is adapted to fit on a base (20) for use with existing blenders or food processors. An example of an existing blender is shown in FIG. 3, in which the base (20) has a recessed well (24). The base (20) can has a plurality of bumpers (26) as shown in FIG. 5, which typically function to secure the container assembly (30) and dampen the effects of vibration during use. For such blenders, the weighing device (50) is configured to fit in the recessed well (24) and within the plurality of bumpers (26).

Referring further to the embodiment shown in FIG. 6(a), the weighing device (50) is adapted to fit on the base (20) and under the container assembly (30). The weighing device (50) fits between the base (20) and the container assembly (30) without interfering with the coupling between the impeller (22) and the blade assembly (38) because the impeller (22) is engaged with the blade assembly (38) through the hole (62). This allows the weighing device (50) to remain mounted on base (20) even when the processing device (10) is in operation.

Referring again to FIG. 3, the container body (32) can be placed on the weighing device (50) with the open end (36) oriented upwards and the closed end (34) seated on top of the weighing device (50). In this embodiment, the weighing device (50) has a groove or step (53) for accommodating the closed end (34) of the container body (32) such that the container body (32) can rest centrally on the weighing device (50) without contacting the base (20).

Figure 10B:
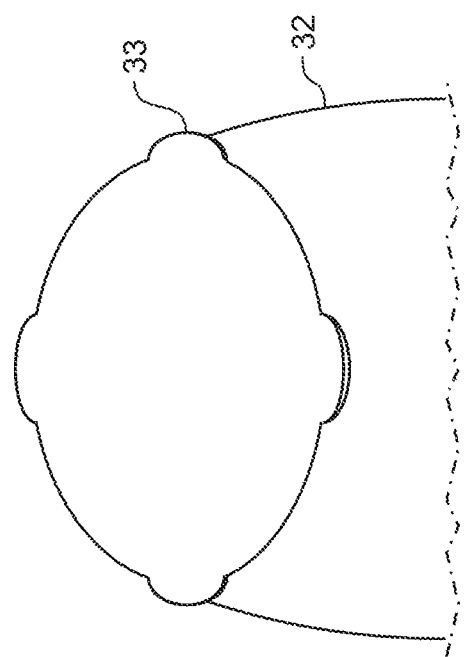
FIG. 10(b) is a bottom view of a container body having tabs according to an embodiment of the invention.
Figure 10A:
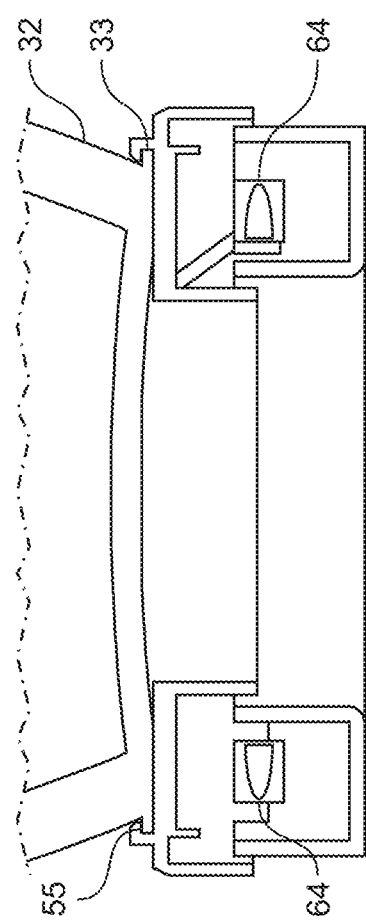
FIG. 10(a) is partial side cross-sectional view of a container body seated on a weighing device having flanges according to an embodiment of the invention.

In another embodiment, the container body (32) can have a plurality of tabs (33) on the bottom end (34) as shown in FIG. 10(b). The weighing device (50) can include slots (55) for securing tabs (33) of the container body (32) as shown in FIG. 10(a). When the tabs (33) are placed in the slots (55) and rotated, the tabs (33) rotate into a slot which prevents the container body (32) from being easily lifted or knocked off the weighing device (50). The slots (55) do not necessarily have to lock the tabs (33), but may be a loose bayonet style connection to prevent accidental separation of the container body (32) from the weighing device (50).

In another configuration as shown in FIG. 6(a), the container assembly (30) can be placed on the weighing device (50) with the closed end (34) oriented upwards and the blade assembly (38) seated on top of the weighing device (50). In either configuration, the weighing device (50) can be calibrated to weigh the comestible content X in container body (32) with or without the blade assembly (38). The weighing device (50) can also be removed from the base (20) to be used as a portable scale for measuring food on any horizontally flat, hard surface such as a countertop. In the foregoing embodiments, the weighing device (50) can be used with existing processors (10).

Figure 7B:
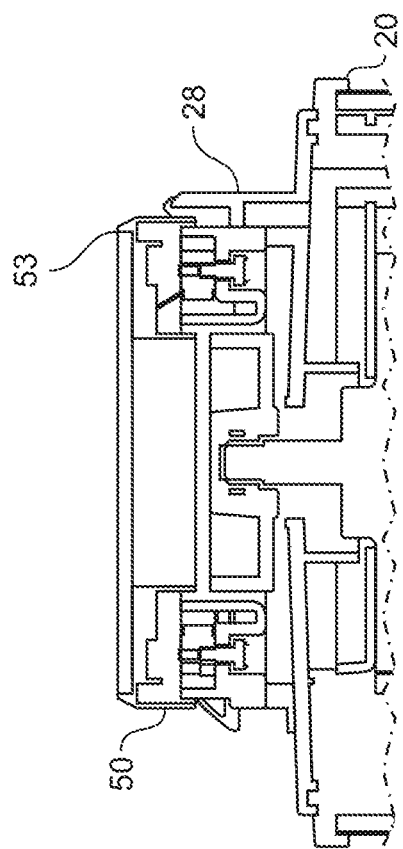
FIG. 7(b) is a partial cross-sectional view of an embodiment of the invention.

In another embodiment of the invention, the weighing device (50) can also be used with processors (10) specially designed to accommodate it. Referring to FIGS. 7(a) and 7(b), a base (20) has a plurality of ramps (28) for securely affixing the weighing device (50) and the container assembly (30).

Figure 8B:
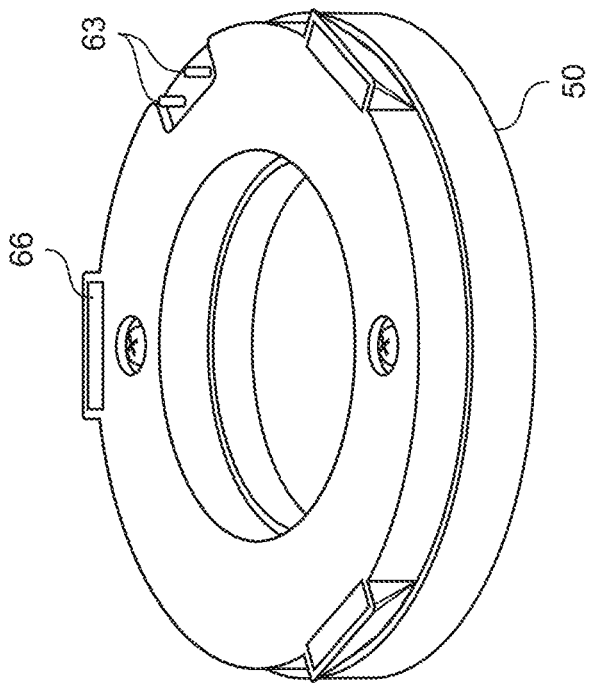
FIG. 8(b) is a bottom perspective view of a weighing device according to an embodiment of the invention.
Figure 8A:
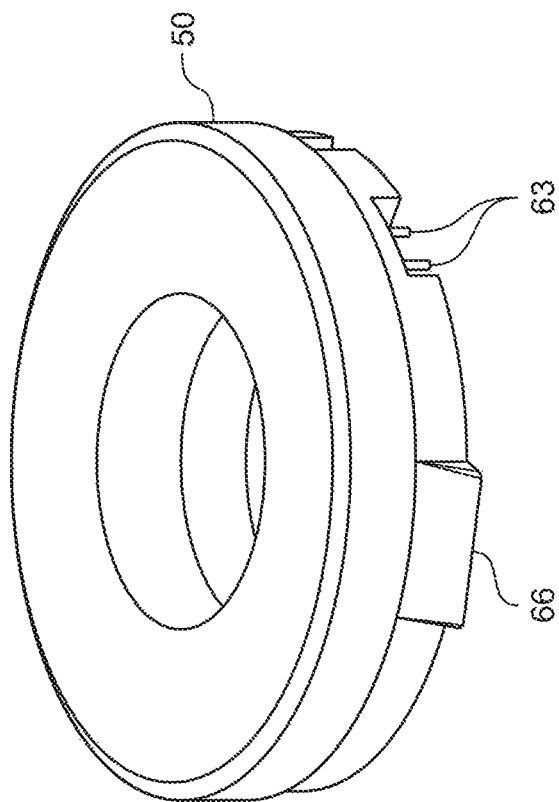
FIG. 8(a) is a top perspective view of a weighing device according to an embodiment of the invention.
Figure 9C:
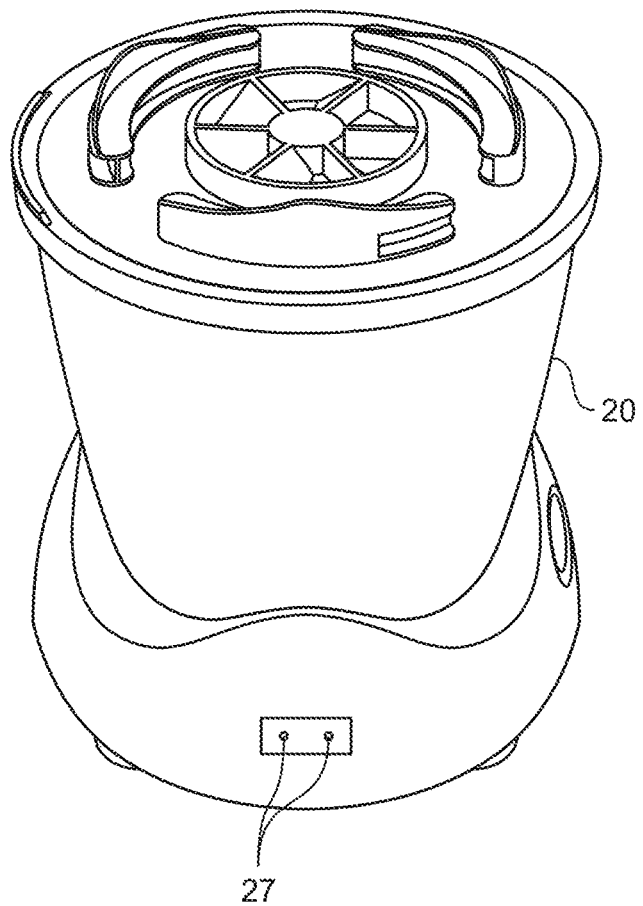
FIG. 9(c) is a perspective view of a base having plug receptors according to an embodiment of the invention.

Referring to FIGS. 8 and 9, the weighing device (50) according to this embodiment has plugs (63) to plug into the receptors (29) on top of base (20). The plugs (63) can also be plugged into receptors (27) shown in FIG. 9(c) so that the weighing device (50) can sit on a counter for weighing ingredients. The weighing device (50) may have rubber pads (66) to reduce accidental movement when it sits on the counter.

The weighing device (50) can be powered by various means to suit the foregoing embodiments. In one embodiment, the weighing device (50) will use traditional alkaline batteries or rechargeable batteries enclosed in the casing (52) for use with existing processors (10). Alternatively, the weighing device (50) can have plugs (63) for plugging into the base (20) for use with processors that have receptors (27, 29).

Figure 11B:
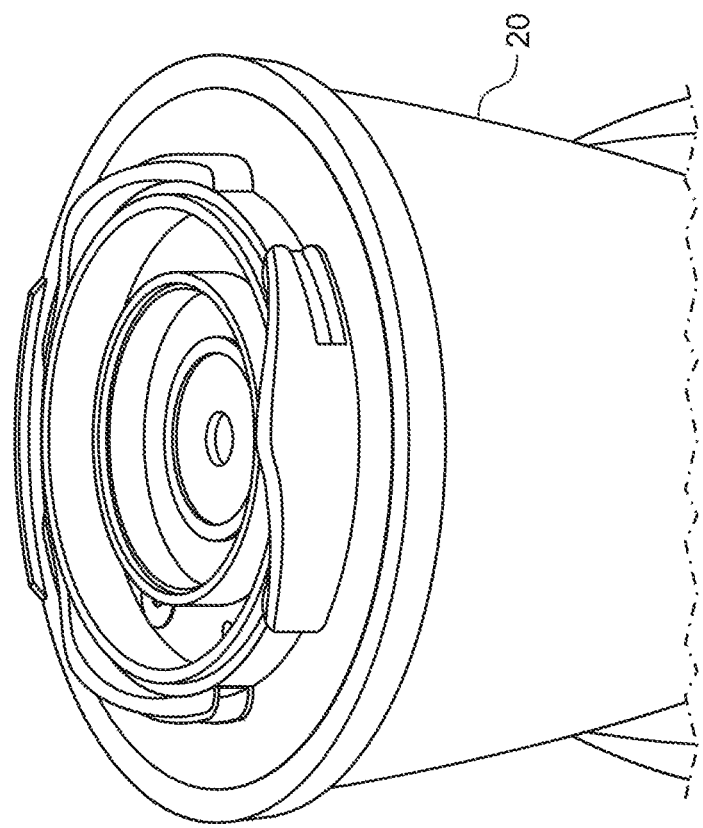
FIG. 11(b) is perspective view of a base with the integrated weighing mechanism removed according to an embodiment of the present invention.
Figure 11A:
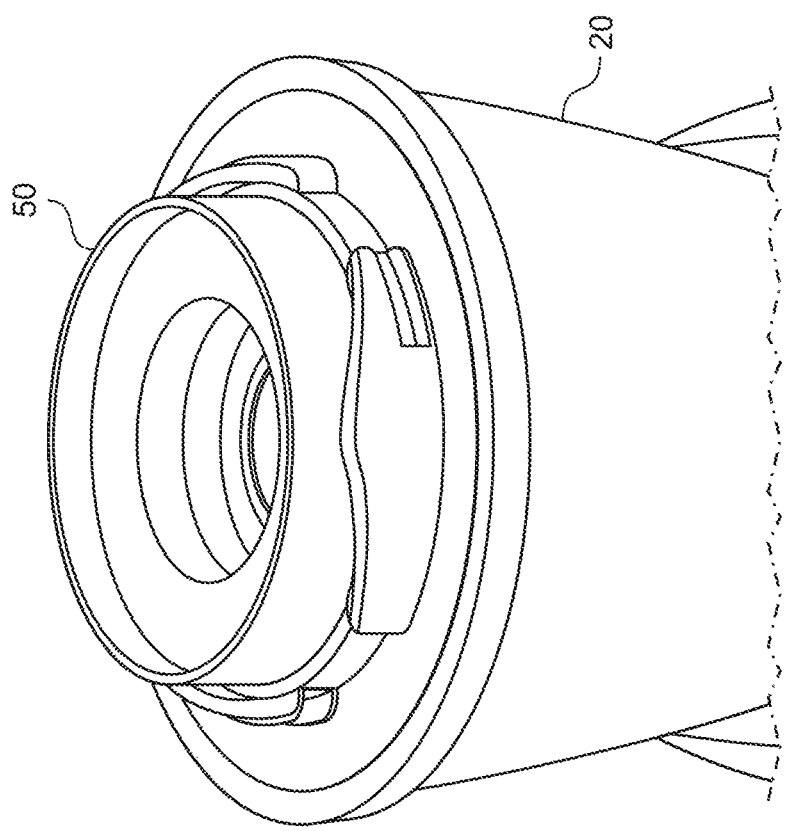
FIG. 11(a) is a perspective view of a base having an integrated weighing mechanism according to an embodiment of the invention.

Referring to FIGS. 11(a) and 11(b), in another embodiment the weighing device (50) and associated electronics are integrated into the base (20). The weighing device (50) is integrally affixed to the base (20) and contains at least one load cell (64) and separate printed circuit board (PCB) incorporating a means for wireless transmission (such as via Bluetooth connection) of the weight data measured by the load cell (64). In this embodiment, the weighing device (50) is integrated into the top of the base (20) to receive the container assembly (30).

In all the foregoing embodiments, the weighing device (50) measures weight of comestible content X and then transmits the weight information wirelessly to a mobile device (70) for various calculations and visual display of information necessary to accurately complete a recipe.

The weighing device (50) and the container body (32) may also contain sensor elements such as magnetic sensors so that the weighing device (50) can automatically detect the type of container body (32) by detecting the weight of the container body (32).

In operation, the weighing device (50) is placed in a base (20) and turned on for use. In an embodiment, an LED light comes on to indicate the weighing device (50) is turned on and ready to pair with a mobile device (70). Following an initial pairing process, the device will automatically pair with a mobile application when the application is opened and Bluetooth connection is active on the mobile device (70). Upon activation, the user will place the container body (32) (open end (36) up) on the weighing device (50). The recipe application will automatically tare the weight of the container body (32) and communicate that the system is ready for the first ingredient to be added to the container body (32). The system can utilize all the functionality and features of any weight-based recipe application.

For additional interactions between the weighing device (50) and the recipe application and the features of the recipe application, U.S. Pat. No. 8,829,365 of Wallace et al., entitled "System and Method for Maintaining Receipt Ratios When Measuring Ingredients for Culinary Combinations," is incorporated herein by reference.

Once all the ingredients for the recipe are added, the container body (32) can be removed from the weighing device (50) and the blade holder (42) is attached for blending. At this point the user can decide to deactivate the weighing device (50) or leave it on for additional or repeated use. Once the blade holder (42) is attached to the container body (32), the user will place the container body (32) and blade holder assembly (38) into the base (20) and begin processing. After use, the user can either store the weighing device (50) in the blender or remove it for cleaning or other use. When cleaning the device (50), the user can wash and rinse the devise without concern of liquid ingress.

In an embodiment, the weighing device is connected to a recipe application via a short-range protocol such as Bluetooth or Wi-Fi. In turn, the recipe application is connected to a remote server via a long-range protocol such as the Internet. The recipe application collects the user recipe and weighing information from the weighing device (50) in real time and transmits the information to the remote server.

In another embodiment of the invention, the recipe application can also collect the time, location and personal information of a user using the weight device (50) of the present invention and transmit such information to the remote server. The remote server may collect aggregated customer data and conduct analysis on customer behaviors based on the data relating to the present invention.

In another embodiment of the invention, the remote server can also transmit real time data to the recipe application to provide recommendations of recipes or adjustments of recipe ratios to the users. For example, if the remote server detects that a user is seeking a tequila related recipe, then the remote server can transmit data for a particular tequila recipe and also data of other similar cocktail recipes that may be trending among other users of the system to the recipe application so that they can be recommended and displayed to the user.

As another example, there may be various versions of the recipe based on popular adjustments or variations by other users. When the user is about to add, or has begun to add ingredients, to the container of a blender, the remote server, upon receiving real time data from the recipe application, retrieves data information on other users' variations on the same or similar recipe and provides data of different adjustment ratios for the recipe to the recipe application. If, for example, the original recipe does not contain blueberries, the recipe application may recommend adding a certain amount of blueberries based on the data of other popular versions of the recipe collective from the universe of users. Or, as another example, the recipe application may recommend a reduced amount of sugar to be added based on other users' feedback.

In another embodiment, the operation of the blender or food processor can be automatically adjusted based on the communication and interaction between the weighing device (50) and the recipe application on the computing device (70).

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A system for processing comestible matter, said system comprising:
   an apparatus for processing said comestible matter,
     wherein said apparatus comprises a base having a motor for driving an impeller and a container assembly, said container assembly comprising a container body having an open end for receiving said comestible matter to be processed and a blade assembly for processing said comestible matter, said blade assembly being adapted to couple with said impeller, and said apparatus is operated by mounting said container assembly on said base by coupling said blade assembly with said impeller and activating said motor; and a weighing device for weighing said comestible matter, wherein said weighing device is affixed to said apparatus, wherein said weighing device is adapted to fit on said base and under said container assembly for weighing said comestible matter in said container body, wherein said container body comprises a tab; and wherein said weighing device comprises a slot for receiving said tab such that said container assembly is securely affixed to said weighing device.

2. The system for processing comestible matter of claim 1, further comprising a mobile device for communicating with said weighing device.

3. The system for processing comestible matter of claim 1, wherein said weighing device is removably mounted on said base such that said weighing device can be used to weigh said comestible matter regardless of whether said weighing device is mounted on said base.

4. The system for processing comestible matter of claim 1, wherein said weighing device is further adapted to fit between said base and said container assembly without interfering with said coupling between said impeller and said blade assembly.

5. The system for processing comestible matter of claim 1, wherein:

said weighing device is annular and has a donut-shaped case defined by a top surface, a bottom surface, an outer circumferential surface, and an inner circumferential surface such that a hollow space is formed;

said weighing device is mounted on a top surface of said base such that said impeller is located in said hollow space; and said container assembly sits on said top surface of said weighing device when said blade assembly is coupled with said impeller.

6. The system for processing comestible matter of claim 1, wherein:

said base has a recessed well;

said blade assembly is further adapted to fit in said recessed well; and said weighing device fits in said recessed well under said blade assembly.

7. The system for processing comestible matter of claim 1, wherein:

said base has at least one rampart; and said weighing device is removably affixed to said rampart.

8. The system for processing comestible matter of claim 1, wherein said weighing device is integrated in said apparatus.

9. The system for processing comestible matter of claim 1, wherein said weighing device comprises:

an electronic means for weighing said comestible matter;

a power source for operating said electronic means; and a wireless transmitter for transmitting a signal.

10. The system for processing comestible matter of claim 9, wherein said power source is a rechargeable battery.

11. The system for processing comestible matter of claim 9, wherein said electronic means for weighing said comestible matter comprises at least one load cell.

12. The system for processing comestible matter of claim 2, wherein said weighing device comprises a means for wireless communication with said mobile device.

13. The system for processing comestible matter of claim 12, wherein said means for wireless communication is through a Bluetooth protocol.

14. The system for processing comestible matter of claim 1, wherein said weighing device is powered via a connection to said base.

15. A system for weighing comestible matter to be processed, said system comprising:

an apparatus for processing said comestible matter;

wherein said apparatus comprises a base having a motor for driving an impeller and a container assembly, said container assembly comprising a container body having an open end for receiving said comestible matter to be processed and a blade assembly for processing said comestible matter, said blade assembly being adapted to couple with said impeller, and said apparatus is operated by mounting said container assembly on said base by coupling said blade assembly with said impeller and activating said motor;

a weighing device for weighing said comestible matter;

wherein said weighing device is adapted to fit on said base and under said container assembly for weighing said comestible matter in said container body, wherein said container body comprises a tab, and wherein said weighing device comprises a slot for receiving said tab such that said container assembly is securely affixed to said weighing device; and a computing device;

wherein said weighing device communicates information relating to said weighing of said comestible matter to said computing device.

16. The system for weighing comestible matter of claim 15, wherein an operation of said apparatus can be automatically adjusted based on said communication between said weighing device and said computing device.

* * * * *